United States Patent
Kang et al.

(10) Patent No.: US 9,924,125 B2
(45) Date of Patent: Mar. 20, 2018

(54) MULTI-SCREEN DISPLAY DEVICE AND MANUFACTURING METHOD THEREOF

(71) Applicant: Samsung Display Co., Ltd., Yongin-si, Gyeonggi-do (KR)

(72) Inventors: Ki Nyeng Kang, Seoul (KR); Jong Hyun Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/281,319

(22) Filed: Sep. 30, 2016

(65) Prior Publication Data

US 2017/0094817 A1 Mar. 30, 2017

(30) Foreign Application Priority Data

Sep. 30, 2015 (KR) .................. 10-2015-0137665

(51) Int. Cl.
| | |
|---|---|
| *H04N 5/64* | (2006.01) |
| *G06F 1/16* | (2006.01) |
| *G09F 19/00* | (2006.01) |
| *G09F 9/302* | (2006.01) |

(52) U.S. Cl.
CPC ............... *H04N 5/64* (2013.01); *G06F 1/16* (2013.01); *G09F 9/3023* (2013.01); *G09F 19/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,054,968 A | * | 4/2000 | De Matteo | G09F 15/0068 312/7.2 |
| 6,314,669 B1 | * | 11/2001 | Tucker | G09F 9/33 340/815.45 |
| 6,338,215 B1 | * | 1/2002 | Vincent | A47G 1/065 40/729 |
| RE42,091 E | * | 2/2011 | Moscovitch | B60R 11/02 348/794 |
| 2006/0201039 A1 | * | 9/2006 | Gilliland | A47G 1/065 40/605 |
| 2006/0268500 A1 | * | 11/2006 | Kuhn | G06F 1/1616 361/679.04 |
| 2009/0225506 A1 | * | 9/2009 | Lee | H05K 5/0017 361/679.21 |
| 2010/0060587 A1 | * | 3/2010 | Freund | G06F 1/1616 345/169 |
| 2010/0064244 A1 | * | 3/2010 | Kilpatrick, II | G06F 1/1616 715/773 |

(Continued)

FOREIGN PATENT DOCUMENTS

| | | |
|---|---|---|
| JP | 2011-170350 A | 9/2011 |
| KR | 1020120058747 A | 6/2012 |
| KR | 1020140033914 A | 3/2014 |

*Primary Examiner* — Lisa Lea Edmonds
(74) *Attorney, Agent, or Firm* — Cantor Colburn LLP

(57) ABSTRACT

A display device according to an exemplary embodiment includes: a first display unit having a polygon shape for displaying an image; and a plurality of second display units displaying an image and respectively disposed adjacent to respective sides of the polygon of the first display unit. The plurality of second display units may be bent based on the respective sides such that the first display unit and the plurality of second display units form a three-dimensional shape.

20 Claims, 8 Drawing Sheets

(56) References Cited

U.S. PATENT DOCUMENTS

2015/0014650 A1    1/2015   Lim et al.
2015/0378393 A1*  12/2015   Erad .................... G06F 1/1616
                                                            345/1.3
2016/0267821 A1*   9/2016   Cross ................... A47F 3/001
2017/0084208 A1*   3/2017   Durant .................. G09F 7/04

* cited by examiner

MULTI-SCREEN DISPLAY DEVICE AND MANUFACTURING METHOD THEREOF

This application claims priority to Korean Patent Application No. 10-2015-0137665 filed on Sep. 30, 2015, and all the benefits accruing therefrom under 35 U.S.C. § 119, the contents of which in their entirety are incorporated herein by reference.

BACKGROUND (a) Field

The invention relates to a display device and a manufacturing method thereof.

(b) Description of the Related Art

Generally known display devices include a liquid crystal display ("LCD"), a plasma display panel ("PDP"), an organic light emitting diode ("OLED") display, a field effect display ("FED"), an electrophoretic display, and the like.

Particularly, the OLED display includes two electrodes and an organic emission layer interposed therebetween. Electrons injected from one electrode and holes injected from the other electrode are combined in the organic emission layer to generate excitons, and the generated excitons release energy to emit light.

The OLED display may have an overall reduced thickness and weight due to a self-luminance characteristic thereof and does not require an additional light source, unlike the LCD. In addition, the OLED display receives attention as a next generation display device owing to high quality characteristics thereof such as relatively low power consumption, high luminance and high response speed.

A display device, a screen of which can be viewed by a user at various positions, has been developed. Particularly, a display device having a sphere-like shape has been developed.

SUMMARY

One or more exemplary embodiment of the invention provides a display device that allows a user to view a screen and observe an image of the display device at various positions thereof.

A display device according to an exemplary embodiment includes: a first display unit which displays an image and includes sides which define an overall polygon shape of the first display unit; and a second display unit provided in plural each displaying an image and respectively extended from a side of the first display unit. The second display units extended from the respective sides of the first display unit are disposed in a different plane from the first display unit and in different planes from each other to define an overall three-dimensional shape of the display device.

Among the second display units disposed in the different planes from each other, edges of adjacent second display units facing each other may be attached to each other.

Each of the second display units may have a quadrangular shape defined by: a first side thereof shared by the polygon shape of the first display unit; a second side thereof separated from and facing the first side; and third and fourth sides thereof respectively connecting ends of the first side and the second side to each other.

Each of the second display units may have a trapezoidal shape.

The display device may further include a first peripheral portion extended from the second side of each of the second display units.

The first peripheral portion may include a driving unit which drives the second display unit from which the first peripheral portion extends.

Each of the second display units may include a second peripheral portion extended from at least one of the third side and the fourth side.

Among the second display units disposed in the different planes from each other, the second peripheral portion may be disposed in a different plane from the second display unit from which the second peripheral portion extends and may be attached to a back side of an adjacent second display unit or to the second peripheral portion of the adjacent second display unit.

The first display unit may include a sub-display unit provided in plural from which the second display units respectively extend, each sub-display unit having a triangle shape of which one side thereof forms a side among the sides of the first display unit.

A first display area of the display device may be defined by a sub-display unit and a second display unit extended therefrom.

A second display area of the display device may be defined by at least two adjacent sub-display units and the second display units respectively extended therefrom.

The display device may further include for the second display area, a plurality of signal lines connected to each other to connect the at least two adjacent sub-display units and the second display units respectively extended therefrom to each other.

The polygon shape of the first display unit may have one of a triangular, quadrangular, hexagonal, heptagonal, octagonal, nonagonal, decagonal, undecagonal, and dodecagonal planar shape.

A manufacturing method of a display device according to an exemplary embodiment may include: preparing a planar substrate; disposing on the planar substrate, a first display unit which displays an image and includes sides which define an overall polygonal shape of the first display unit, and a second display unit provided in plural each displaying an image and respectively extended from a side of the first display unit; separating a portion of the planar substrate having the first display unit and the second display units thereon from a remainder of the planar substrate, along an overall outer edge defined by outer edges of the first display unit and the second display units; and bending the separated portion of the planar substrate having the first display unit and the second display units thereon along respective boundaries between the first display unit and the second display units. The bending the separated portion of the planar substrate disposes the second display units in a different plane from the first display unit and in different planes from each other to define an overall three-dimensional shape of the display device.

Separating the portion of the planar substrate may include cutting the substrate by a laser.

The method may further include attaching adjacent second display units to each other among the second display units in the different planes from each other, to define the overall three-dimensional shape of the display device.

Among the second display units disposed in the different planes from each other, each of the second display units may have a quadrangular shape defined by: a first side thereof shared by the polygon shape of the first display unit; a second side thereof separated from and facing the first side; and third and fourth sides thereof respectively connecting ends of the first side and the second side to each other.

Each of the second display units may have a trapezoidal shape.

The manufacturing method may further include disposing on the planar substrate, a first peripheral portion extended from the second side of each of the second display units.

Each of the second display units may include a second peripheral portion extended from at least one of the third side and the fourth side.

According to one or more exemplary embodiments of the display device and the manufacturing method thereof described above, since the display device has a three-dimensional shape, the user can see the screen of the display device in various directions.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
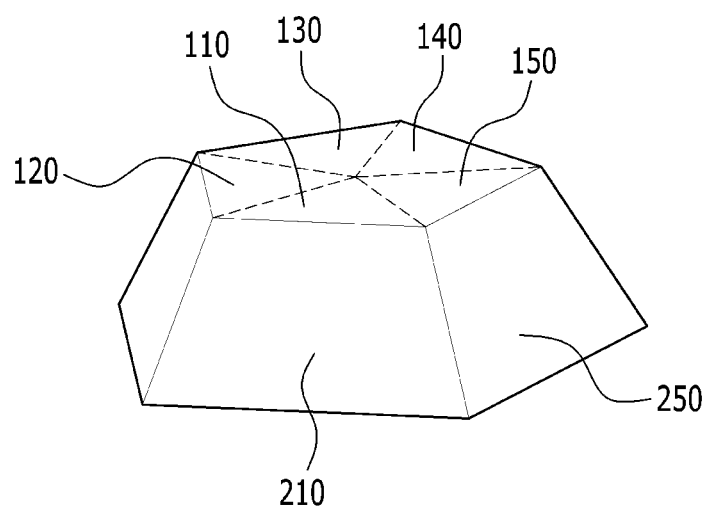
FIG. 1 is a perspective view of an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention. The drawings and description are to be regarded as illustrative in nature and not restrictive. Like reference numerals designate like elements throughout the specification.

Further, in the drawings, the size and thickness of each element are arbitrarily illustrated for ease of description, and the invention is not necessarily limited to those illustrated in the drawings.

In the drawings, the thickness of layers, films, panels, regions, etc. are exaggerated for clarity. In the drawings, for ease of description, the thicknesses of some layers and regions are exaggerated. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

Further, in the specification, the word "on" means positioned on or below the object portion, and does not necessarily mean positioned on the upper side of the object portion based on a gravitational direction.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
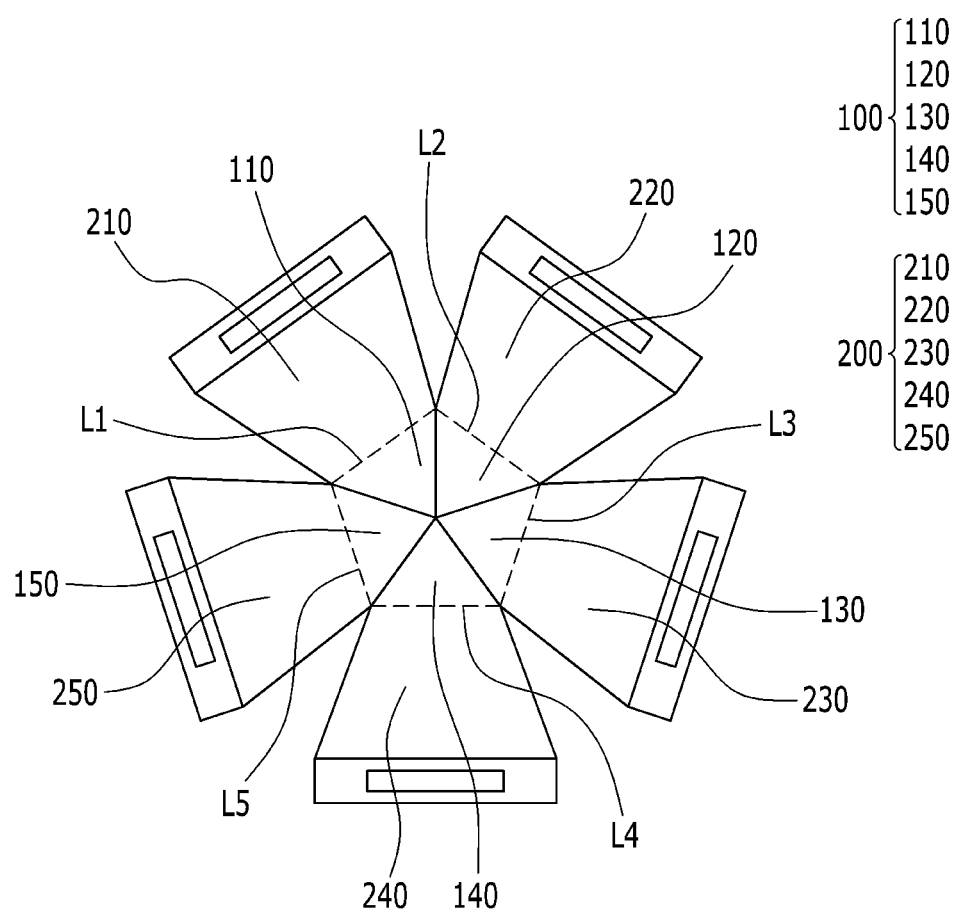
FIG. 2 is a planar view of the display device of FIG. 1 according to the invention.
Figure 3:
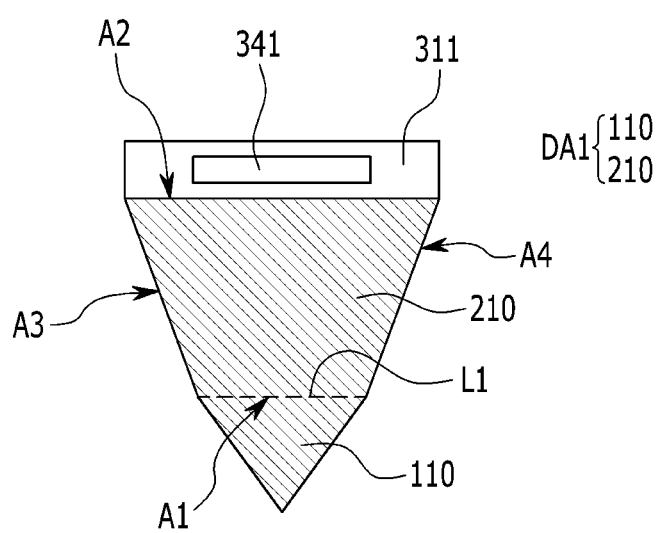
FIG. 3 is an enlarged planar view of an exemplary embodiment of a first display area the display device of FIG. 2.

Referring to FIGS. 1 to 3, an exemplary embodiment of a display device according to the invention will now be described.

FIG. 1 is a perspective view of an exemplary embodiment of a display device according to the invention, FIG. 2 is a planar view of the display device of FIG. 1 according to the invention, and FIG. 3 is an enlarged planar view of an exemplary embodiment of a first display area of the display device of FIG. 2.

Referring to FIGS. 1 to 3, the display device includes a first display unit 100 and a plurality of second display units 200. The display device having a three-dimensional shape can be formed by disposing the first display unit 100 and the plurality of second display units 200 in different planes from each other. The different planes may be referenced from bending lines at a boundary between the first display unit 100 and the plurality of second display units 200.

The first display unit 100 displays an image, and may have a polygonal shape in a planar (e.g., two-dimensional) view. Outer edges of the first display unit 100 define the overall polygonal shape thereof. In FIGS. 1 and 2, the first display unit 100 has a regular pentagonal shape in the planar view. However, the first display unit 100 is not necessarily limited thereto, and the first display unit 100 may have triangular, quadrangular, hexagonal, heptagonal, octagonal, nonagonal, decagonal, undecagonal, and dodecagonal shape in the planar view. In exemplary embodiments, the first display unit 100 may have regular triangular, regular quadrangular, regular hexagonal, regular heptagonal, regular octagonal, regular nonagonal, regular decagonal, regular undecagonal, and regular dodecagonal shapes.

In the exemplary embodiment, the first display unit 100 emits light to display an image, and the light is emitted by a display panel (not shown) disposed or formed on a substrate (not shown). The display panel may include an organic light emitting diode display ("OLED"), a liquid crystal display ("LCD"), a plasma display device ("PDP"), a field effect display ("FED"), or an electrophoretic display.

The first display unit 100 may be defined by a sub-display unit provided in plural to define the overall planar shape of the first display unit 100. According to the exemplary embodiment, the first display unit 100 may consist of a plurality of sub-display units 110, 120, 130, 140 and 150. When the first display unit 100 has an overall regular pentagonal shape, the plurality of sub-display units 110, 120, 130, 140 and 150 are divided into five sub-display units. The plurality of sub-display units 110, 120, 130, 140 and 150 may be disposed in a same plane as each other such that the first display unit 100 is disposed in a single plane.

Within the overall regular pentagonal shape of the display unit 100, each of the plurality of sub-display units 110, 120, 130, 140 and 150 has a triangular shape. A side of each of the plurality of sub-display units 110, 120, 130, 140 and 150, that is, one side of each triangle, defines a side of the overall polygonal shape of the display unit 100. That is, in the exemplary embodiment, the first display unit 100 having an overall regular pentagonal shape is defined or formed by the five sub-display units 110, 120, 130, 140 and 150 each having the triangular shape.

When the first display unit 100 has the regular polygonal shape, each of the plurality of sub-display units 110, 120, 130, 140 and 150 may have an isosceles triangular shape.

Figure 8:
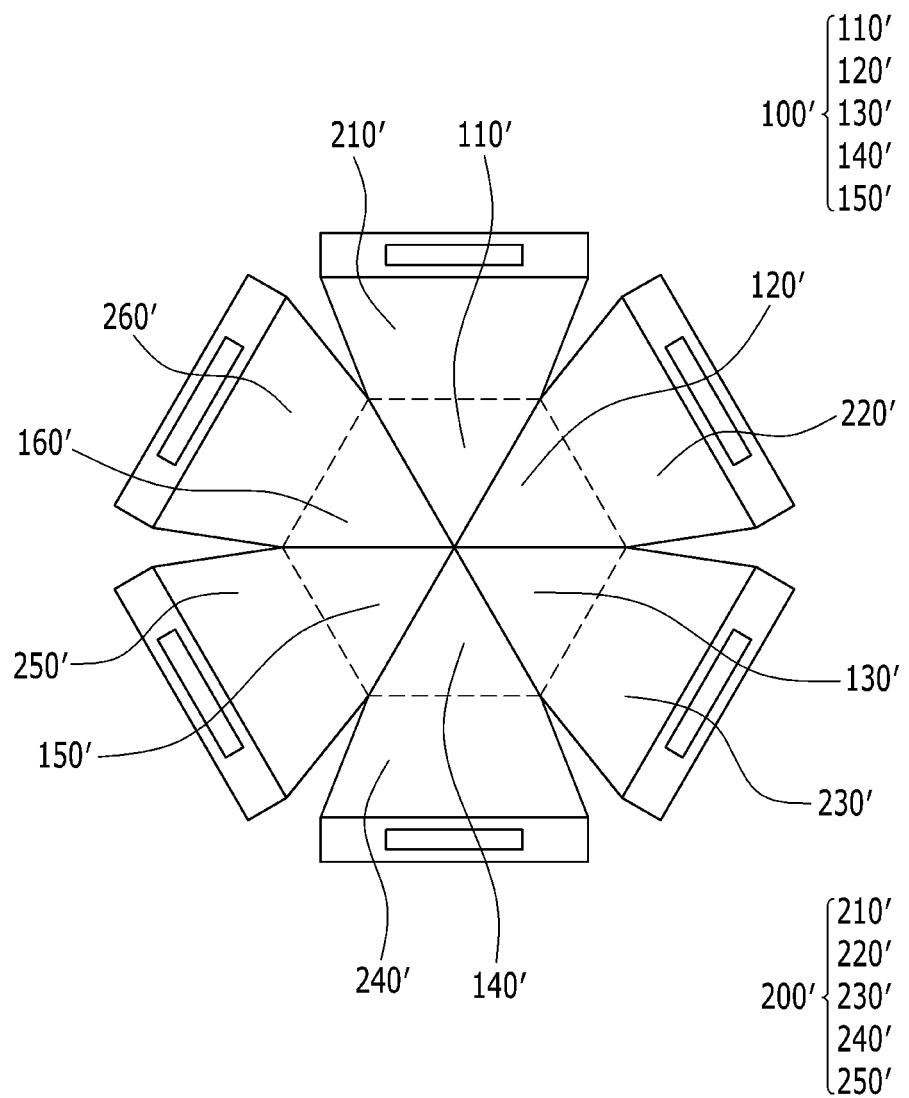
FIG. 8 is a planar view of another exemplary embodiment of a display device according to the invention.

As shown in FIG. 8, if a first display unit 100' has a regular hexagonal shape in the planar view, the first display unit 100' having the regular hexagonal shape is defined or formed by six sub-display units 110', 120', 130', 140', 150' and 160' each having a triangular shape. As such, a side of each of the plurality of six sub-display units 110', 120', 130', 140', 150' and 160' defines a side of the overall hexagonal shape of the display unit 100'.

The plurality of second display units 200 is combined with the first display unit 100. The plurality of second display units 200 are respectively disposed adjacent to and extended from each side of the first display unit 100 having the polygonal shape.

Referring to FIG. 2, second display units 210, 220, 230, 240 and 250 define the plurality of second display units 200 and are respectively combined with and extended from a side of the first display unit 100 having the regular pentagonal shape. That is, each of the second display units 210, 220, 230, 240 and 250 is combined with and extended from a sub-display unit among the sub-display units 110, 120, 130, 140 and 150.

Specifically, the second display unit 210 is combined with and extended from the sub-display unit 110, and the second display unit 220 is combined with and extended from the sub-display unit 120. The second display unit 230 is combined with and extended from the sub-display unit 130, the second display unit 240 is combined with and extended from the sub-display unit 140, and the second display unit 250 is combined with and extended from the sub-display unit 150.

According to the exemplary embodiment, each of the second display units 210, 220, 230, 240 and 250 may have a quadrangular shape in the planar view. In exemplary embodiments, each of the second display units 210, 220, 230, 240 and 250 may have a trapezoidal shape.

Referring to FIG. 3, each of the second display units 210, 220, 230, 240 and 250 may have the trapezoidal shape including and defined by a first side A1, a second side A2, a third side A3 and a fourth side A4.

The first side A1 is shared by one side of the polygon of the first display unit 100. In addition, the second side A2 and the first side A1 face each other while being separated from each other. The third side A3 and the fourth side A4 respectively interconnect opposite ends of the first side A1 with opposite ends of the second side A2.

A first peripheral portion 311 of the display device is combined with and extended from the second side A2 of the second display unit 210. A driving unit 341, which drives the second display unit 210 and the sub-display unit 110 adjacent to the second display unit 210, may be disposed in the first peripheral portion 311. Referring to FIG. 1, within the three-dimensional shape of the display device, the first peripheral portion 311 may be bent from the second side A2 of the second display unit 210 such that the first peripheral portion may not be visible in the three-dimensional shape of the display device. While FIG. 3 illustrates the peripheral portion 311 and the driving unit 341 with respect to the second display unit 210, the peripheral portion 311 and the driving unit 341 may be similarly applied to remaining second display units among the second display units 220, 230, 240 and 250 of FIG. 2.

The driving unit 341 includes a scan driver (not shown) for driving the sub-display unit 110 and the second display unit 210, a data driver (not shown), and a light emission control driving unit (not shown). Among portions of the driving unit 341, the scan driver may receive a control signal from outside thereof to generate a scan signal, and the data driver may receive a control signal from outside thereof to generate a data signal. The light emission control driving unit sequentially supplies a light emission control signal to a light emission control line (not shown) in response to the control signal supplied from outside thereof such as from a timing controller.

Referring to FIG. 2 and FIG. 3, the first peripheral portions are respectively combined to a second display unit among the plurality of second display units 210, 220, 230, 240 and 250, and the driving unit 341 may be disposed in each of the first peripheral portions 311.

According to the exemplary embodiment, one of the plurality of second display units 200 respectively adjacent to one of the plurality of sub-display units 110, 120, 130, 140, and 150 forms or defines a first display area DA1 of the display device. Here, the first display area DA1 represents an area (e.g., screen) in which one image can be displayed by being driven by one driving unit 341. Referring to FIGS. 1-3, for example, the display screen defined by first display area DA1 is disposed in two different planes. One plane of the display screen is defined by the first display unit 100 and another plane of the display screen is defined by a respective second display unit among the plurality of second display units 200.

That is, as shown in FIG. 3, one sub-display unit 110 and one second display unit 210 adjacent thereto, form or define the first display area DA1. The one sub-display unit 110 and the one second display unit 210 adjacent thereto may collectively form one screen (indicated by the diagonal hatching) of the display device. Accordingly, the driving unit 341 in the peripheral portion 311 extended from the second display unit 210 may drive the first display area DA1 that is formed or defined by the one sub-display unit 110 and the one second display unit 210 adjacent thereto.

Referring back to FIG. 2, the sub-display unit 110 and the second display unit 210, the sub-display unit 120 and the second display unit 220, the sub-display unit 130 and the second display unit 230, the sub-display unit 140 and the second display unit 240, and the sub-display unit 150 and the second display unit 250 separately form or define a first display area DA1 of the display device. Where the first display area DA1 is separately formed as described above, the display device includes the first display area DA1 provided in plural to define plural screens of the display device. The plural screens may display a same image, but the invention is not limited thereto.

Finally, the display device according to the exemplary embodiment is divided into the five first display areas DA1, and each of the first display areas DA1 may individually display an image. The image of the various first display areas DA1 may be the same as each other or may be different from each other, since the first display area DA1 represents an area in which one image can be displayed by being driven by one driving unit 341.

Referring to FIGS. 1 and 2, in the display device according to the exemplary embodiment of the invention, the second display units 210, 220, 230, 240 and 250 are extended from a respective side of the polygon that forms the first display unit 100, such that the first display unit 100 and the plurality of second display units 200 together form a three-dimensional shape of the display device. For purposes of description, within the display device, a portion of the first display unit 100 may be extended to respectively define the second display units 210, 220, 230, 240 and 250 and the corresponding peripheral portions 311 further extended from the second display units 210, 220, 230, 240 and 250.

The sub-display unit 110 and the second display unit 210 are disposed in different planes from each other based on one side L1 of the polygon that forms the first display unit 100. Here, the side L1 corresponds to the first side A1 of the second display unit 210.

In addition, the sub-display unit 120 and the second display unit 220 are disposed in different planes from each other based on a side L2, the sub-display unit 130 and the second display unit 230 are disposed in different planes from each other based on a side L3, and the sub-display unit 140 and the second display unit 240 are disposed in different planes from each other based on a side L4. The sub-display unit 150 and the second display unit 250 are disposed in different planes from each other based on a side L5. The sides L1, L2, L3, L4 and L5 may be the boundary respectively between the first display unit 100, and the second display units 210, 220, 230, 240 and 250. The display device may be bent at the sides L1, L2, L3, L4 and L5 to dispose the various sub-display units in different planes from the second display units.

Where the display device may be bent at the sides L1, L2, L3, L4 and L5 to dispose the various sub-display units in different planes from the second display units, the second display units 210, 220, 230, 240 and 250 respectively adjacent to each other are disposed close to each other and may be attached to each other to form the display device having the three-dimensional shape.

Specifically, referring to FIG. 1 and FIG. 2, adjacent edges of the second display units 210 and 220 facing each other are combined such that they are closely attached to each other. In addition, the edge of the second display unit 220 and an edge of the second display unit 230 facing each other are closely attached to each other, the edge of the second display unit 230 and an edge of the second display unit 240 facing each other are closely attached to each other, and the edge of the second display unit 240 and an edge of the second display unit 250 facing each other are closely attached to each other. Finally, the edge of the second display unit 250 and the edge of the second display unit 210 facing each other are closely attached to each other. Accordingly, the planar (e.g., two-dimensional) figure of the display device according to the exemplary embodiment illustrated in FIG. 2 may form the display device having the three-dimensional shape of FIG. 1.

Referring to FIG. 1, the display device according to the exemplary embodiment may consist of the five first display areas DA1 such that each of the first display areas DA1 individually displays the image.

Figure 4:
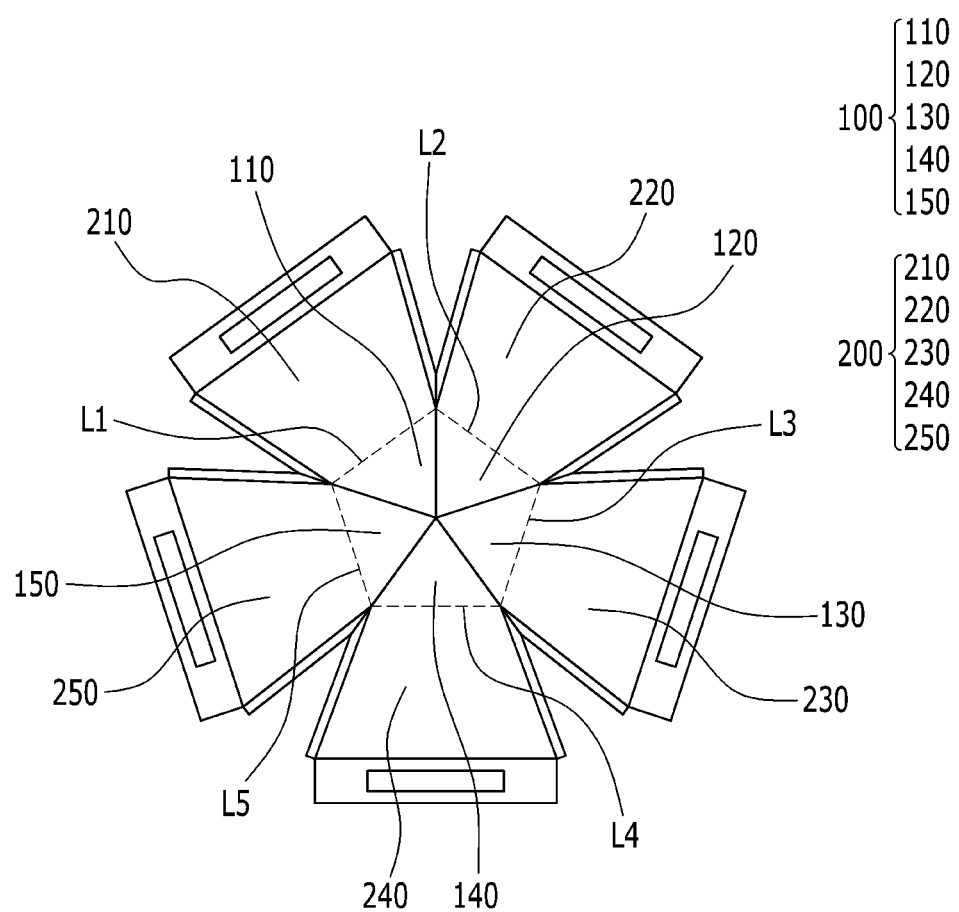
FIG. 4 is a planar view of an exemplary variation of the display device of FIG. 1 according to the invention.
Figure 5:
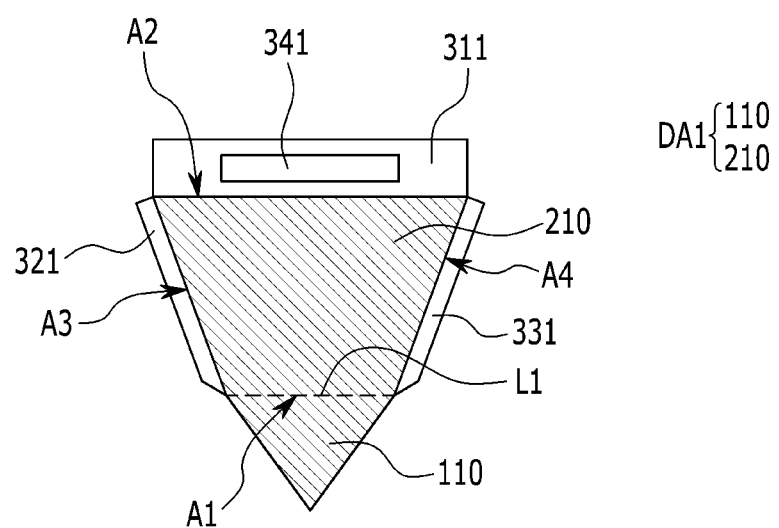
FIG. 5 is an enlarged planar view of an exemplary embodiment of a first display area of the display device of FIG. 4.

Referring to FIGS. 4 and 5, an exemplary variation of the display device according to the invention will now be described. In describing the exemplary variation of FIGS. 4 and 5, a detailed description of the same components as those of the aforementioned exemplary embodiment will be omitted.

FIG. 4 is a planar view of an exemplary variation of the display device according to the invention, and FIG. 5 is an enlarged planar view of a first display area of FIG. 4.

Referring to FIGS. 4 and 5, each of second display units 210, 220, 230, 240 and 250 may have a trapezoidal shape including and defined by a first side A1, a second side A2, a third side A3 and a fourth side A4.

The first side A1 is shared by one side of a polygon of a first display unit 100. In addition, the second side A2 and the first side A1 face each other while being separated from each other. The third side A3 and the fourth side A4 respectively connect opposite ends of the first side A1 with opposite ends of the second side A2.

Second peripheral portions 321 and 331 may be combined to and extended from at least one of the third side A3 and the fourth side A4 of the second display unit 210. In the exemplary variation illustrated in FIGS. 4 and 5, the second peripheral portion 321 is combined with and extended from the third side A3 and the second peripheral portion 331 is combined with and extended from the fourth side A4. That is, in the exemplary variation, the second peripheral portions 321 and 331 are illustrated such that they are respectively combined with and extended from the third side A3 and the fourth side A4. Alternatively, a second peripheral portion may be combined with only one of the third side A3 and the fourth side A4.

Where the display device may be bent at the sides L1, L2, L3, L4 and L5 to dispose the various sub-display units in different planes from the second display units, the second peripheral portion 321 of the second display unit 210 and the second peripheral portion of the adjacent second display unit 220 are closely attached to each other. As shown in FIG. 4, the adjacent second peripheral portions of the adjacent second display units 210 and 220 are disposed close to each other and may be attached to each other to form the display device having the three-dimensional shape. The planar views of the adjacent second peripheral portions may be disposed to face each other to be attached to each other. That is, the second display units 210, 220, 230, 240 and 250 may be bent at the sides from which the adjacent second peripheral portions extend such that the adjacent second display units 210, 220, 230, 240 and 250 may be closely attached and fixed to each other at the adjacent second peripheral portions. Accordingly, referring back to FIG. 1, the first display unit 100 and the second display unit 200 may together form a three-dimensional shape of the display device. Since the adjacent second peripheral portions may be disposed to face each other to be attached to each other, the adjacent second peripheral portions may not be visible in the three-dimensional shape of the display device.

Alternatively, when the second peripheral portion is combined with and extended from only one of the third side A3 and the fourth side A4 of the second display unit 210, when the display device is bent at side L1 and the second display unit 210 is bent at the side from which the second peripheral portion is extended, the second peripheral portion of the second display unit 210 is combined with a back side of the adjacent second display unit 220. That is, referring again to FIG. 1, since the second peripheral portion of the second display unit 210 is combined with a back side of the adjacent second display unit 220, the second peripheral portion may not be visible in the three-dimensional shape of the display device.

Different from the planar view FIG. 5, the second peripheral portion 331 may be extended from only the fourth side A4 of the second display unit 210. Where the second peripheral portion 331 is extended from only the fourth side A4 of the second display unit 210, the second peripheral portion 331 of the second display unit 210 is combined with the back side of the adjacent second display unit 220. The second peripheral portion 331 serves to allow the second display unit 210 and the second display unit 220 to be fixed to each other. That is, referring again to FIG. 1, since the second peripheral portion at the fourth side A4 of the second display unit 210 is combined with the back side of the adjacent second display unit 220, the second peripheral portion at the fourth side A4 may not be visible in the three-dimensional shape of the display device.

On the other hand, a plurality of signal lines may be disposed on or formed in the second peripheral portions 321 and 331 that are combined with adjacent ones among the second display units 210, 220, 230, 240 and 250. In an exemplary embodiment, for example, the signal lines disposed on or formed in the second peripheral portions 321 and 331 may extend to scan lines or data lines disposed or formed within the second display units 210, 220, 230, 240 and 250.

Alternatively, among pixels defined or formed within the second display units 210, 220, 230, 240 and 250, a portion of those pixels may be defined or formed in the second peripheral portions 321 and 331 of the second display units 210, 220, 230, 240 and 250. Accordingly, when edges of the adjacent second display units 210 and 220 facing each other are closely disposed next to each other or attached to each other, a dead space may not be formed in vicinities of the edges. Here, the dead space represents a section of the second display unit where an image is not displayed. As such, a non-display section of the second display unit is minimized.

Figure 6:
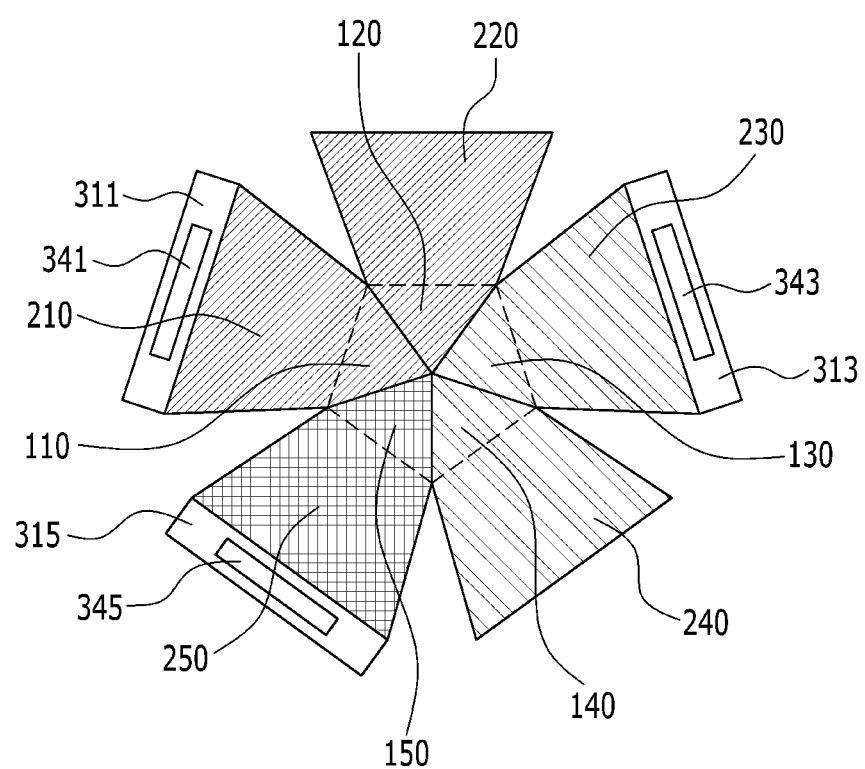
FIG. 6 is a planar view of another exemplary variation of the display device of FIG. 1 according to the invention.
Figure 7:
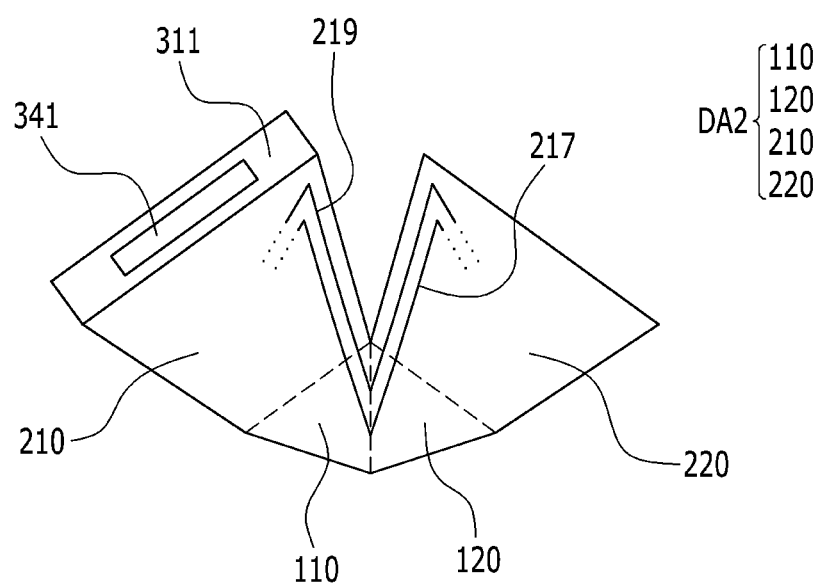
FIG. 7 is an enlarged planar view of an exemplary embodiment of a first display area and a second display area of the display device of FIG. 6.

Referring to FIGS. 6 and 7, another exemplary variation of the display device according to the invention will now be described. In describing the exemplary variation of FIGS. 6 and 7, a detailed description of the same components as those of the aforementioned exemplary embodiments will be omitted.

FIG. 6 is a planar view another exemplary variation of the display device according to the invention, and FIG. 7 is an enlarged planar view of a second display area of FIG. 6.

Referring to FIGS. 6 and 7, sub-display units 110 and 120 and second display units 210 and 220 respectively adjacent to each other form one second display area DA2 of the display device. In the aforementioned exemplary embodiment, one first display area DA1 was formed by one sub-display unit and one second display unit. However, in the exemplary variation of FIGS. 6 and 7, two adjacent first areas DA1 form one second display area DA2. Referring to FIGS. 1, 6 and 7, for example, the display screen defined by second display area DA2 is disposed different planes. A first plane of the display screen is defined by the first display unit 100, a second plane is defined by the second display unit 210 and a third plane is defined by the second display unit 220.

As a result, the sub-display units 110 and 120 and the second display units 210 and 220 adjacent to each other form the second display area DA2, thereby displaying one image. The sub-display units 110 and 120 and second display units 210 and 220 are indicated with a same hatch pattern in FIG. 6 to illustrate the collective second display area DA2 at which the one image is displayed. That is, the second display area DA2 may define a screen of the display device.

In the exemplary embodiment, as shown in FIG. 6, the sub-display units 110 and 120 and the second display units 210 and 220 form one second display area DA2, and sub-display units 130 and 140 and second display units 230 and 240 form another second display area DA2. The sub-display units 130 and 140 and second display units 230 and 240 are indicated with a same hatch pattern in FIG. 6 to illustrate the collective second display area DA2 at which one image is displayed. In addition, a remainder of the sub-display units and the second display units, that is, the sub-display unit 150 and the second display unit 250, may form one first display area DA1. The sub-display unit 150 and the second display unit 250 are indicated with a same hatch pattern in FIG. 6 to illustrate the collective first display area DA1 at which one image is displayed. That is, referring to FIG. 1 and FIG. 6, within a single display device, two second display areas DA2 and one first display area DA1 may be formed.

However, the invention is not limited thereto, and at least two adjacent ones of the plurality of sub-display units and the second display units each of which is adjacent to the at least two adjacent ones of the sub-display units, may form the second display area DA2. That is, one second display area DA2 may be formed not only by the two sub-display units described above, but also by three sub-display units and three corresponding second display units respectively combined with and extended from the three sub-display units.

In the exemplary embodiment of FIGS. 6 and 7, one driving unit is combined with each of the display areas DA1 and DA2. In an exemplary embodiment, for example, the first peripheral portion 311 at which the driving unit 341 is disposed is combined with the second display unit 210 forming a second display area DA2, the first peripheral portion 313 at which the driving unit 343 is disposed is combined with the second display unit 230 forming a second display area DA2, and the first peripheral portion 315 at which the driving unit 345 is disposed is combined with the second display unit 250 forming a first display area DA1. A driving unit may be positioned in each of the first peripheral portions 311, 313 and 315.

Referring to FIG. 7, length portions of a plurality of signal lines 217 and 219 passing through the sub-display units 110 and 120 and the second display units 210 and 220 of one second display area DA2 are connected to each other. The second display area DA2 is driven by one driving unit 341, and a plurality of signal lines 217 and 219 disposed or formed in the sub-display units 110 and 120 and the second display units 210 and 220 of the second display area DA2 may be connected to each other such that they are driven by the driving unit 341. Here, the plurality of signal lines 217 and 219 may each be one or more scan line and/or one or more data line. Although not explicitly shown in FIG. 7, the signal lines 217 and 219 may be connected to the driving unit 341.

The features of either of the exemplary variations in FIGS. 4 and 5 and FIGS. 6 and 7 may be similarly applied to the regular hexagonal shape shown in FIG. 8. As such, a detailed description of the same components in the exemplary variations as those of the display device in FIG. 8 will be omitted.

An exemplary embodiment of a manufacturing method of a display device according to the invention will now be described. In describing the manufacturing method of the display device according to the exemplary embodiments of the invention, a detailed description of the same components as those of the aforementioned display device will be omitted.

First, as shown in FIG. 2, FIG. 4, FIG. 6 or FIG. 8, a first display unit 100 and a plurality of second display units 200 are each prepared such as by disposing or forming elements thereof on a planar substrate (not shown) such that an overall three-dimensional shape of the display device can be finally manufactured. Among the elements shown in FIG. 2, FIG. 4, FIG. 6 or FIG. 8, a plurality of second display units 200 are disposed relative to the first display unit 100 having an overall polygonal shape. That is, a display panel emitting light, a touch panel, and the like are formed in the aforementioned shape on the substrate.

A portion of the planar substrate having the elements of the first display unit 100 and the plurality of second display units 200 thereon is separated from a remainder of the planar substrate such as by cutting the planar substrate along an outer edge of the overall planar figure illustrated in FIG. 2, FIG. 4, FIG. 6 or FIG. 8. The overall planar figure illustrated in FIG. 2, FIG. 4, FIG. 6 or FIG. 8 is a two-dimensional figure from which a three-dimensional shape of the display device will be formed. To separate the portion of the planar substrate, the substrate may be cut along the outer edge of the overall planar figure by using a laser. However, the invention is not limited thereto, and the substrate may be cut using a pinnacle. Generally, a pinnacle includes embossed pinnacle blades for more precisely and stably cutting a precise and complicated shape such as a functional film, a double-sided tape, a sticker and an flexible printed circuit board ("FPCB") material, which are usually cut by an existing wooden pattern or a mold, and is also called an embossed mold.

Where the plurality of second display units 200 includes second display units 210, 220, 230, 240 and 250, the planes of the second display units 210, 220, 230, 240 and 250 are changed relative to the first display unit 100. Referring to FIGS. 2 and 3 for example, the display device is bent at respective sides L1, L2, L3, L4 and L5 of the polygon that forms the first display unit 100 to dispose the second display units 210, 220, 230, 240 and 250 in different planes from that of the first display unit 100 to form a three-dimensional shape from the two-dimensional shape of the overall planar figure. With the second display units 210, 220, 230, 240 and 250 in a bent state relative to the plane of the first display unit 100, second display units 210, 220, 230, 240 and 250 respectively adjacent to each other are attached to each other. The respectively adjacent second display units 210, 220, 230, 240 and 250 may be attached to each other at edges thereof and/or by overlapping portions thereof.

In an exemplary embodiment where second display units include second peripheral portions, adjacent second display units may be fixed to each other via the second peripheral portions respectively of the second display units 210, 220, 230, 240, and 250. Referring to FIGS. 4 and 5, for example, as described above, when the second peripheral portion is combined with and extended from only one of the third side A3 and the fourth side A4 of the second display unit 210, the second peripheral portion of the second display unit 210 may be combined with a back side of the adjacent second display unit 220 such that they are fixed to each other.

As such, after the second display units 210, 220, 230, 240 and 250 are disposed in the bent stated thereof relative to the respective sides L1, L2, L3, L4 and L5 of the polygon of the first display unit 100, respectively adjacent second display units 210, 220, 230, 240 and 250 are attached to each other, thereby forming a display device having a three-dimensional shape from the initial two-dimensional shape on the substrate.

In the exemplary embodiments of the display device and the manufacturing method thereof according to the invention, the display device having the three-dimensional shape can be formed from a two-dimensional planar figure by disposing the plurality of second display units 200 in a different plane from that of the first display unit 100 having the polygonal shape in the two-dimensional planar figure, and then attaching respectively adjacent second display units 210, 220, 230, 240 and 250 among the plurality of second display units 200 to each other.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a first display unit which displays an image and includes sides which define an overall polygon shape of the first display unit; and
   a second display unit provided in plural each displaying an image and respectively extended directly from a side of the first display unit,
   wherein the second display units extended directly from the respective sides of the first display unit are disposed in a different plane from the first display unit and in different planes from each other to define an overall three-dimensional shape of the display device.

2. The display device of claim 1, wherein among the second display units disposed in the different planes from each other, edges of adjacent second display units facing each other are attached to each other.

3. The display device of claim 2, wherein each of the second display units has a quadrangular shape defined by:
   a first side thereof shared by the polygon shape of the first display unit;
   a second side thereof separated from and facing the first side;
   and third and fourth sides thereof respectively connecting ends of the first side and the second side to each other.

4. The display device of claim 3, wherein each of the second display units has a trapezoidal shape.

5. The display device of claim 3, further comprising a first peripheral portion extended from the second side of each of the second display units.

6. The display device of claim 5, wherein the first peripheral portion comprises a driving unit which drives the second display unit from which the first peripheral portion extends.

7. The display device of claim 3, wherein each of the second display units comprises a second peripheral portion extended from at least one of the third side and the fourth side.

8. The display device of claim 7, wherein among the second display units disposed in the different planes from each other, the second peripheral portion is disposed in a different plane from the second display unit from which the second peripheral portion extends and is attached to a back side of an adjacent second display unit or to the second peripheral portion of the adjacent second display unit.

9. The display device of claim 3, wherein the first display unit includes a sub-display unit provided in plural from which the second display units respectively extend, each sub-display unit having a triangle shape of which one side thereof forms a side among the sides of the first display unit.

10. The display device of claim 9, wherein a first display area of the display device is defined by a sub-display unit and a second display unit extended therefrom.

11. The display device of claim 9, wherein a second display area of the display device is defined by at least two adjacent sub-display units and the second display units respectively extended therefrom.

12. The display device of claim 11, further comprising for the second display area, a plurality of signal lines connected to each other to connect the at least two adjacent sub-display units and the second display units respectively extended therefrom to each other.

13. The display device of claim 1, wherein the polygon shape is one of a triangular, quadrangular, hexagonal, heptagonal, octagonal, nonagonal, decagonal, undecagonal and dodecagonal planar shape.

14. A manufacturing method of a display device, comprising:
  preparing a planar substrate;
  disposing on the planar substrate,
    a first display unit which displays an image and includes sides which define an overall polygonal shape of the first display unit, and
    a second display unit provided in plural each displaying an image and respectively extended from a side of the first display unit;
  separating a portion of the planar substrate having the first display unit and the second display units thereon from a remainder of the planar substrate, along an overall outer edge defined by outer edges of the first display unit and the second display units; and
  bending the separated portion of the planar substrate having the first display unit and the second display units thereon along respective boundaries between the first display unit and the second display units,
  wherein the bending the separated portion of the planar substrate disposes the second display units in a different plane from the first display unit and in different planes from each other to define an overall three-dimensional shape of the display device.

15. The manufacturing method of claim 14, wherein separating the portion of the planar substrate comprises cutting the substrate by a laser.

16. The manufacturing method of claim 14, further comprising attaching adjacent second display units to each other among the second display units in the different planes from each other, to define the overall three-dimensional shape of the display device.

17. The manufacturing method of claim 14, wherein among the second display units disposed in the different planes from each other, each of the second display units has a quadrangular shape defined by:
  a first side thereof shared by the polygon shape of the first display unit;
  a second side thereof separated from and facing the first side; and
  third and fourth sides thereof respectively connecting ends of the first side and the second side to each other.

18. The manufacturing method of claim 17, wherein each of the second display units has a trapezoidal shape.

19. The manufacturing method of claim 17, further comprising disposing on the planar substrate, a first peripheral portion extended from the second side of each of the second display units.

20. The manufacturing method of claim 17, wherein each of the second display units comprises a second peripheral portion extended from at least one of the third side and the fourth side.

* * * * *